US009540060B2

(12) United States Patent
Hutson

(10) Patent No.: US 9,540,060 B2
(45) Date of Patent: Jan. 10, 2017

(54) OMNI-DIRECTIONAL TREADS

(71) Applicant: QUALCOMM Incorporated, San Diego, CA (US)

(72) Inventor: Donald Bolden Hutson, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 99 days.

(21) Appl. No.: 14/448,958

(22) Filed: Jul. 31, 2014

(65) Prior Publication Data

US 2015/0266525 A1    Sep. 24, 2015

Related U.S. Application Data

(60) Provisional application No. 61/969,049, filed on Mar. 21, 2014.

(51) Int. Cl.
| | |
|---|---|
| *B62D 55/125* | (2006.01) |
| *B62D 55/18* | (2006.01) |
| *G05D 17/02* | (2006.01) |
| *B60K 1/02* | (2006.01) |
| *B62D 11/00* | (2006.01) |
| *B62D 15/00* | (2006.01) |
| *B62D 55/20* | (2006.01) |

(52) U.S. Cl.
CPC .............. *B62D 55/125* (2013.01); *B60K 1/02* (2013.01); *B62D 11/00* (2013.01); *B62D 15/00* (2013.01); *B62D 55/18* (2013.01); *B62D 55/20* (2013.01); *G05D 17/02* (2013.01); *Y10S 901/01* (2013.01)

(58) Field of Classification Search
CPC ....... B62D 55/125; B62D 11/00; B62D 15/00; B62D 55/18; B62D 55/20; B60K 1/02
See application file for complete search history.

(56) References Cited

U.S. PATENT DOCUMENTS

| | | | |
|---|---|---|---|
| 7,348,747 B1 * | 3/2008 | Theobold ................. | B25J 5/005 318/568.11 |
| 7,637,831 B2 * | 12/2009 | Araki ..................... | A63H 29/22 180/6.44 |
| 7,836,982 B2 * | 11/2010 | Tsujita ................. | B60K 17/043 180/6.48 |
| 8,540,038 B1 | 9/2013 | Ullman | |
| 8,590,664 B2 * | 11/2013 | Terashima ............. | A61G 5/046 180/411 |
| 2008/0103004 A1 * | 5/2008 | Chen ..................... | G01C 17/00 475/19 |
| 2009/0095544 A1 | 4/2009 | Carlson et al. | |
| 2009/0266628 A1 | 10/2009 | Schempf et al. | |
| 2013/0062153 A1 | 3/2013 | Ben-Tzvi et al. | |

(Continued)

OTHER PUBLICATIONS

International Search Report and Written Opinion—PCT/US2015/018771—ISA/EPO—Jun. 5, 2015.

(Continued)

*Primary Examiner* — Anne Marie Boehler
*Assistant Examiner* — Marlon A Arce
(74) *Attorney, Agent, or Firm* — Seyfarth Shaw LLP

(57) ABSTRACT

A robotic device includes multiple sprockets coupled to a tread module. The robotic device also includes multiple first drive gears coupled to a drive shaft gear of the tread module. The robotic device further includes a second drive gear coupled to a carousel gear of the tread module.

13 Claims, 7 Drawing Sheets

(56) References Cited

U.S. PATENT DOCUMENTS

2014/0049098 A1  2/2014  Keeling et al.
2014/0090906 A1  4/2014  Kornstein et al.

OTHER PUBLICATIONS

"Omni-Crawler Drives in All Directions #DigInfo", https://www.youtube.com/watch?v=BTp2UAaihal, Uploaded on Sep. 28, 2011, DigInfo TV—http://diginfo.tv, Sep. 21, 2011, Osaka University, Omni Ball, Omni-Crawler.

* cited by examiner

OMNI-DIRECTIONAL TREADS

CROSS REFERENCE TO RELATED APPLICATION

The present application claims the benefit of U.S. Provisional Patent Application No. 61/969,049, filed on Mar. 21, 2014, in the name of Donald Bolden HUTSON, the disclosure of which is expressly incorporated by reference herein in its entirety.

BACKGROUND

Field

The present disclosure generally relates to robots, and more particularly, to systems and methods for controlling locomotion of a robot with treads coupled to independently controlled axes.

Background

Various wheel arrangements have been developed to improve the maneuverability of vehicles. A conventional vehicle with independent wheels, such as a car, uses Ackerman steering to turn. Ackerman steering is desirable when paired with a front or rear wheel differential. Still, Ackerman steering is not desirable for use with vehicles that turn in place.

In some cases, treads, such as tank treads, may be used to provide locomotion to a vehicle. The treads may be desirable for all terrain traction, but are inefficient for turning in place. That is, to follow a curved path, the conventional treaded vehicle uses a skid steer to rotate. Still, when used indoors or on fragile surfaces, the treads may damage the surface.

In other cases, vehicle drive systems, such as a drive system used for a robot, may use a multi-axis rotation that allows each wheel to drive in a forward/reverse direction and also to rotate in place. Such wheels may also be referred to as wild swerve wheels. The multi-axis wheels are similar to actuator driven caster wheels, such as the wheels of a shopping cart or office chair. Still, conventional multi-axis wheels are not independently operated.

In industrial vehicles, such as forklifts and tractors, the maneuverability of vehicles can be improved by the provision of omni-directional wheels. One such wheel design is the Mecanum wheel, which has been used in forklifts, wheelchairs, and other applications. Still, because of the shape of the rollers for the Mecanum wheel, only a small area on the outer circumference of each roller contacts a given surface when in operation, which results in a reduced ability to navigate on various surfaces. Additionally, because of the shape of the Mecanum wheel, vehicles using this type of wheel have a raised profile. Thus, vehicles using a Mecanum wheel may not have a low profile for improved maneuverability.

In some cases, an omni-direction tread system is specified to include treads that rotate in various directions, such as forward, backwards, left, and right. Still, the conventional omni-direction tread system includes external belts and pulleys to rotate the treads. Moreover, the electronics of the conventional omni-direction tread system are external to the treads. Thus, because the components of the conventional omni-direction tread system are external, the components may be prone to damage. Moreover, the components are not modular and may be difficult to replace.

Thus, it is desirable to provide an omni-direction tread system that is compact with replaceable parts. The tread system may include independent multi-axis wheels, such as sprockets within a tread, so that the treads may rotate in various directions, such as forward, backwards, left, and right. Furthermore, the components for providing locomotion to the treads should be defined within the tread so that the components of the vehicle are less prone to damage.

SUMMARY

According to an aspect of the present disclosure, a robotic device is presented. The robotic device includes multiple sprockets coupled to a tread module. The robotic device also includes multiple first drive gears coupled to a drive shaft gear of the tread module. The robotic device further includes a second drive gear coupled to a carousel gear of the tread module.

In another aspect of the present disclosure, a method of controlling a robotic device is disclosed. The method includes controlling multiple first drive gears to drive multiple drive shafts. The method also includes controlling multiple second drive gears to drive multiple carousel gears.

Another aspect of the present disclosure is directed to an apparatus including means for controlling multiple first drive gears to drive multiple drive shafts. The apparatus also includes means for controlling multiple second drive gears to drive multiple carousel gears.

In another aspect of the present disclosure, a computer program product for controlling a robotic device is disclosed. The computer program product includes a non-transitory computer readable medium. The computer readable medium has non-transitory program code recorded thereon which, when executed by the processor(s), causes the processor(s) to perform operations of controlling multiple first drive gears to drive multiple drive shafts. The program code also causes the processor(s) to control multiple second drive gears to drive multiple carousel gears.

Another aspect of the present disclosure is directed to an apparatus for controlling a robotic device. The apparatus includes a memory and one or more processors coupled to the memory. The processor(s) is configured to control multiple first drive gears to drive multiple drive shafts The processor(s) is also configured to control multiple second drive gears to drive multiple carousel gears.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
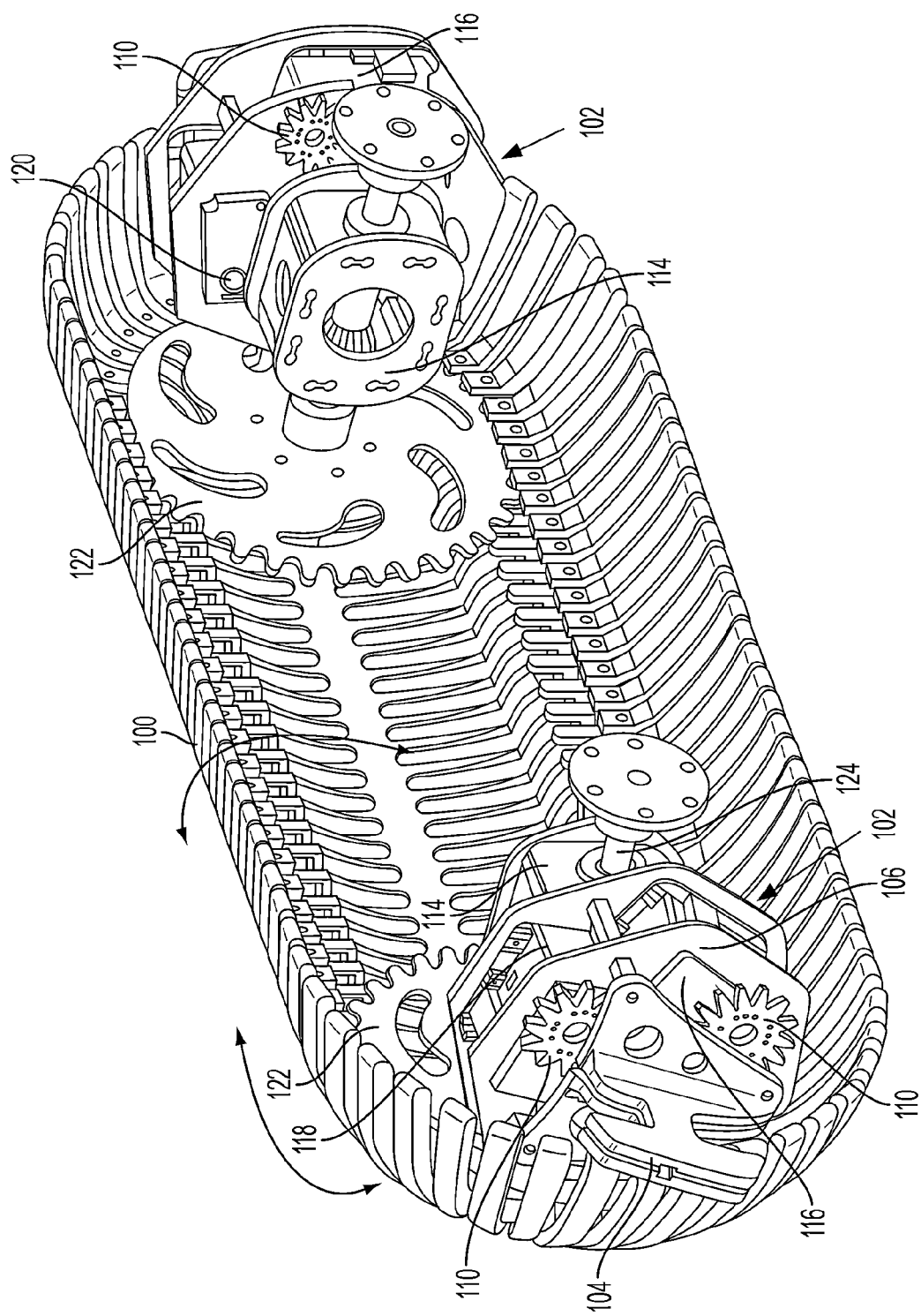
FIG. 1 illustrates an example of a tread for a vehicle according to an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to a vehicle, such as a robot, with treads. In one configuration, the vehicle includes two treads that are controlled by a computer, or other device. Each tread may include two tread modules that rotate the tread forward, backwards, left, and right so that the vehicle may move in various direction, such as forward, backwards, left, and right. The heading and the variable speed of each tread module can be independently controlled.

In addition to providing added maneuverability to a tread, the tread modules may allow for a more compact and an easily replaceable drive system. In one configuration, the electronics and control motors are defined within the tread. More specifically, the rotation and rotation axis of each tread is driven from one or more motors disposed within the tread. Furthermore, aspects of the present disclosure may use off the shelf servos and/or any combination of motors sensors and electronics. The tread design of the present application may also enable object grasping and/or manipulation.

In one configuration, two motors are specified to control the forward/reverse rotation of each tread via sprockets coupled to the tread. Moreover, in the present configuration, another motor is provided within the tread to control the left/right rotation of a carousel coupled to a tread module. In one configuration, the tread module is provided within the two halves of the full tread. The carousel, sprockets, and housing may be referred to as a tread module. It should be noted that each of the multiple treads of the vehicle may operate independently of each other. For example, one tread may rotate forward while another tread may rotate right, thereby causing the vehicle to move at an angle.

Although aspects of the disclosure specify two motors for controlling the forward/reverse rotation of each sprocket and one motor to control the left/right rotation of the carousel, the present disclosure is not limited to the specific number of motors. Of course, more or fewer motors may be specified as desired.

As previously discussed, in one configuration, the motors, electronics, bearings, miter gears and/or mounting frame system are defined within the tread. Thus, based on the aspects of the present disclosure, the replacement/swapping of each tread module for repair/maintenance is improved as the tread modules and tread are interchangeable.

FIG. 1 illustrates a tread 100 according to an aspect of the present disclosure. As shown in FIG. 1, two tread modules 102 are specified within the tread 100. The tread modules 102 may be coupled to the vehicle, such as the robot, via brackets 104. In one configuration, the brackets 104 are stationary. The end of the brackets 104 may be T-shaped to attach to a U-shaped connection of the vehicle.

Moreover, each tread module 102 may include a housing 106. In one configuration, three motors 116, 118, 120 are provided within the housing 106. Aspects of the present disclosure are contemplated for three motors or any other number of desired motors. A drive gear 110 may be coupled to each motor 116, 118, 120. As shown in FIG. 1, the drive gears 110 of the first motor 116 and a second motor 118 are provided on the first surface of the housing 106. The first surface of the housing 106 also includes the drive shaft gear (not shown). The drive gear 110 of the third motor 120 may be provided on a second surface that is different from the first surface of the housing 106.

The drive gears 110 of the first motor 116 and the second motor 118 rotate the drive shaft gear (not shown) of the drive shaft (not shown). In one configuration, the drive shaft may be a hex shaft. Moreover, the drive gear 110 of the third motor 120 may rotate a carousel 114. That is, the drive gear 110 of the third motor 120 drives a carousel gear (not shown) to rotate the carousel 114 left/right. The rotation of the carousel 114 causes the tread 100 to rotate left/right. Thus, when two or more full treads 100 are positioned in a parallel relationship, the vehicle may move right/left (i.e., strafe) based on the right/left rotation of the carousels 114.

Additionally, the carousel houses an axle 124 that is coupled to sprockets 122 that rotate the tread 100. Specifically, the drive gears 110 of the first motor 116 and the second motor 118 rotate the sprockets 122 in a forward/ reverse direction via the drive shaft. That is, the rotation of the sprockets 122 causes the tread 100 to move in a forward/reverse direction.

In one configuration, the carousels 114 may be controlled to rotate in unison. The carousels 114 may be controlled to rotate in unison by electronic systems and/or a shaft that couples the carousels 114 to each other. Moreover, FIG. 1 illustrates one-half of the tread 100 and two sprockets 122. Other aspects of the present disclosure are contemplated for two tread halves 100 to form the full tread so that the tread modules are within the full tread. Each tread half 100 is coupled to two sprockets 122.

Figure 2:
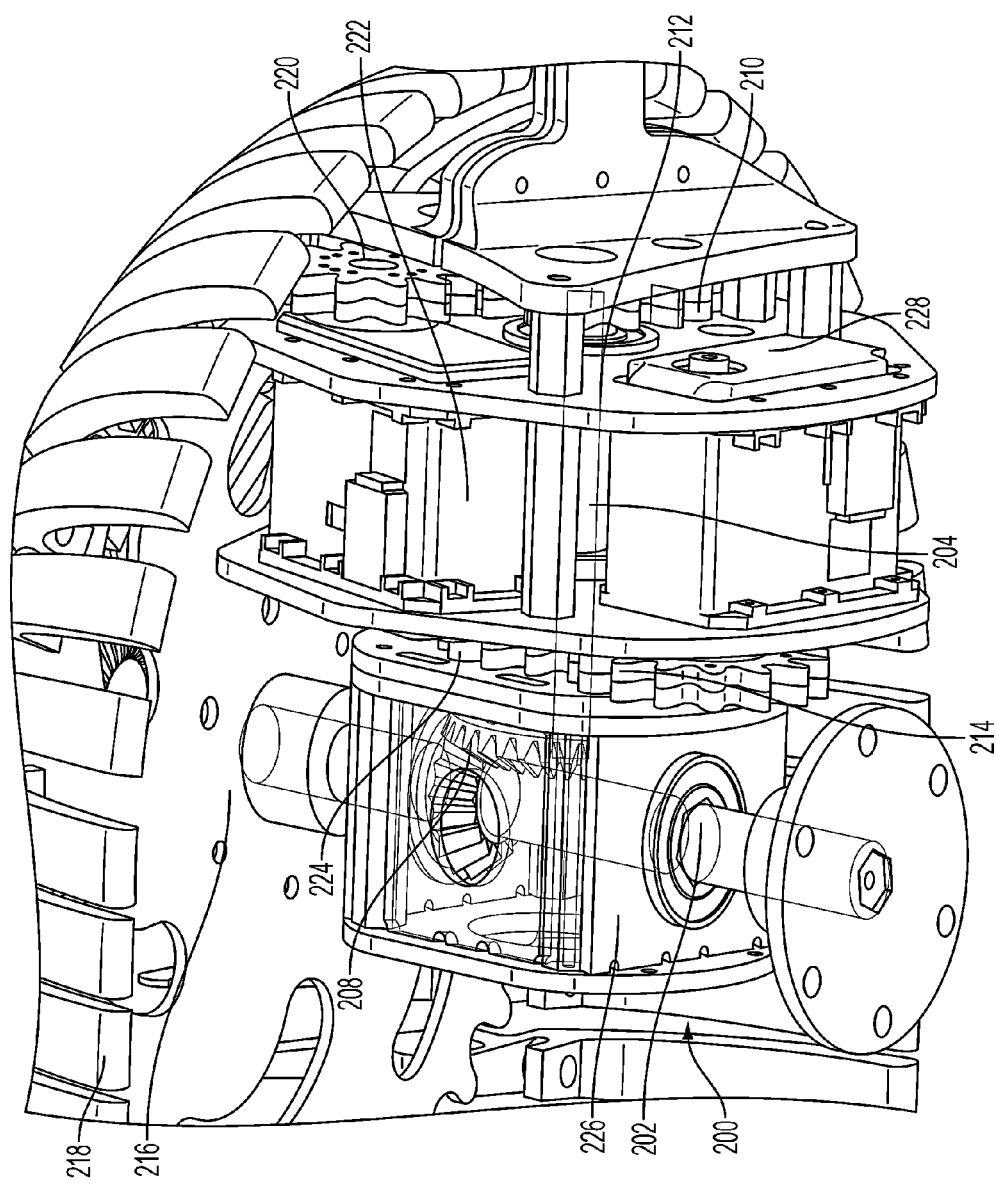
FIGS. 2 and 3 illustrate examples of gears and motors for a tread according to aspects of the present disclosure.

FIG. 2 illustrates a tread module 200 according to an aspect of the present disclosure. As shown in FIG. 2, the tread module 200 may include a housing 212 and a carousel 226 coupled to the housing 212. In one configuration, the housing 212 houses multiple motors 222, 228. The motors 222, 228 are coupled to various drive gears 220, 214. For example, a first motor 222 drives a first drive gear 220. The first drive gear 220 may be coupled to a drive shaft gear 210. In one configuration, a gearbox (not shown) may be specified to provide different gear arrangements to control speed and/or torque. As previously discussed, some of the drive gears 220 within the housing 212 drive the drive shaft gear 210 of the drive shaft 204. The drive shaft 204 is coupled to a differential 208.

As shown in FIG. 2, the differential 208 is housed within the carousel 226. Furthermore, the differential 208 drives the axle 202 that is coupled to the sprockets 216. That is, the first motor 222 and one or more other motors (not shown) drive the drive shaft 204 that drives the axle 202 so that the sprockets 216 may move forward or backward. The rotation of the sprocket 216 causes the tread 218 to rotate. The drive shaft 204 is driven via a drive shaft gear 210 coupled to the housing 212.

Furthermore, as shown in FIG. 2, the tread module 200 may also include a second motor 228 within the housing 212. The second motor 228 may drive a second drive gear 214. The second drive gear 214 may be coupled to a carousel gear 224. In one configuration, a gearbox (not shown) may be used in conjunction with the second drive gear 214 to control the speed and/or torque of the rotation of the carousel gear 224 of the carousel 226. Moreover, the second drive gear 214 drives the carousel gear 224 so that the carousel 226 may move in a left/right direction. The rotation of the carousel 226 causes the tread 218 to rotate left/right.

Figure 3:
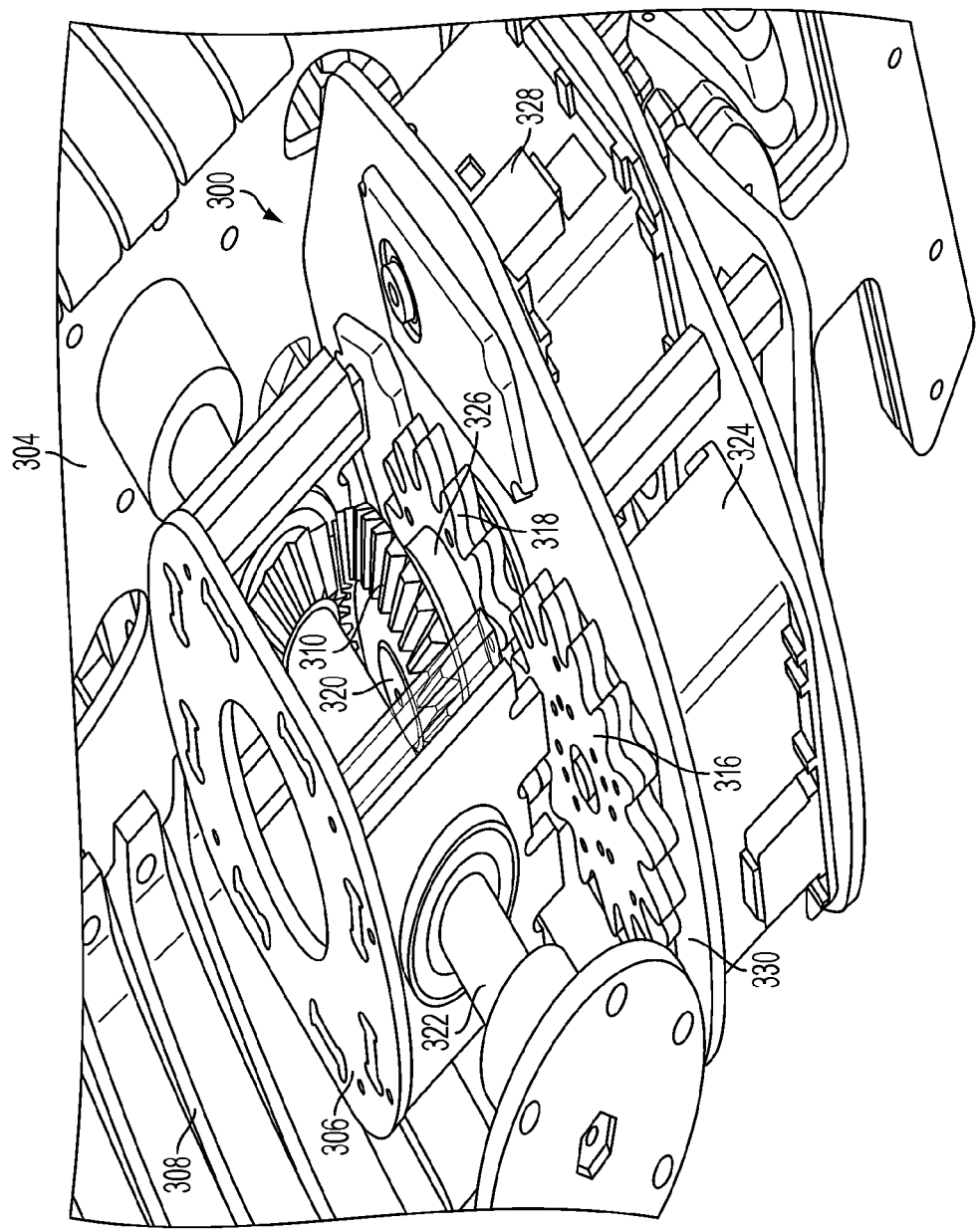

FIG. 3 illustrates a tread module 300 according to an aspect of the present disclosure. As shown in FIG. 3, the tread module 300 may include a housing 330 and a carousel 306 coupled to the housing 330. In one configuration, the housing 330 houses multiple motors 324, 328. The motors 324, 328 are coupled to various drive gears, such as a first drive gear 316.

In one configuration, the first motor 324 drives a first drive gear 316. The first drive gear 316 may be coupled with a carousel gear 318 that is coupled to the carousel 306. The drive gear 316 drives the carousel gear 318 so that the carousel 306 may rotate in a left/right direction. The second motor 328 may drive a second drive gear (not shown) that is used to drive the drive shaft 320.

The carousel 306 also houses an axle 322 that is coupled to the sprockets 304. Furthermore, the carousel 306 houses a differential 310 that is coupled to the axle 322 and the drive shaft 320. The drive shaft 320 is a hex shaft that passes through a bearing 326 of the carousel gear 318. Specifically, the bearing 326 mounts the carousel 306 and allows rotation of the drive shaft 320 without inadvertently causing the carousel 306 to turn.

As previously discussed, some of the drive gears within the housing 330 drive the drive shaft gear (not shown) of the drive shaft 320. The drive shaft gear is coupled to the housing 330. Additionally, the drive shaft 320 is coupled to a differential 310. The differential 310 is specified to drive the axle 322 that is coupled to the sprockets 304. That is, the second motor 328 and a third motor (not shown) provide rotation to the drive shaft 320 that drives the axle 322 so that the sprockets 304 may move in a forward or backward direction, thereby causing the tread 308 to move in a forward or backward direction. The forward/backward rotation of the sprockets 304 causes the tread 308 to rotate forward/backward.

Figure 4A:
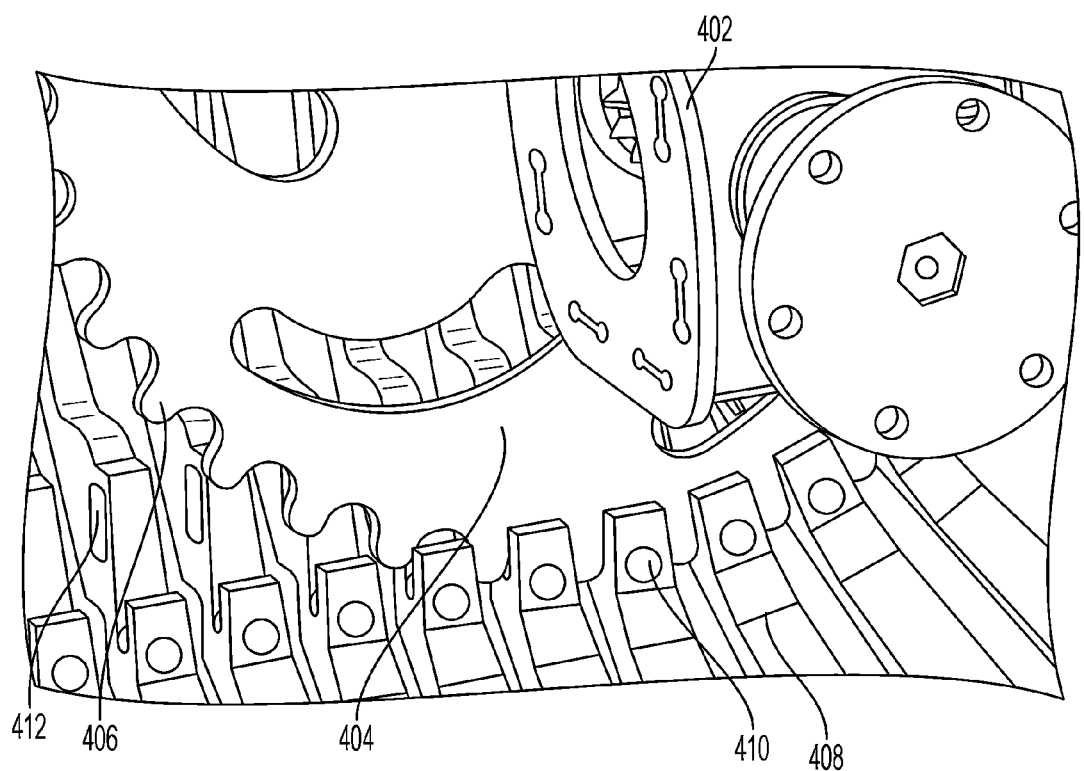
FIGS. 4A and 4B illustrate examples of sprockets for a tread according to aspects of the present disclosure.

FIG. 4A illustrates an example of a sprocket and tread according to an aspect of the present disclosure. As shown in FIG. 4A, the sprocket 404 is coupled to an axle (not shown) that is coupled to the carousel 402. The sprocket 404 may include teeth 406 that engage the grooves of the each tread link 408, similar to a bicycle chain. Multiple tread links 408 are specified to create the tread of the vehicle. Each tread link 408 may also include a first hole 410 that is used to connect the tread links 408 to each other to act like a bicycle chain would as it went around a set of sprockets. Additionally, in one configuration, a second hole 412 is specified in each tread link 408 to reduce the weight. In one configuration, each tread link 408 is curved.

Figure 4B:
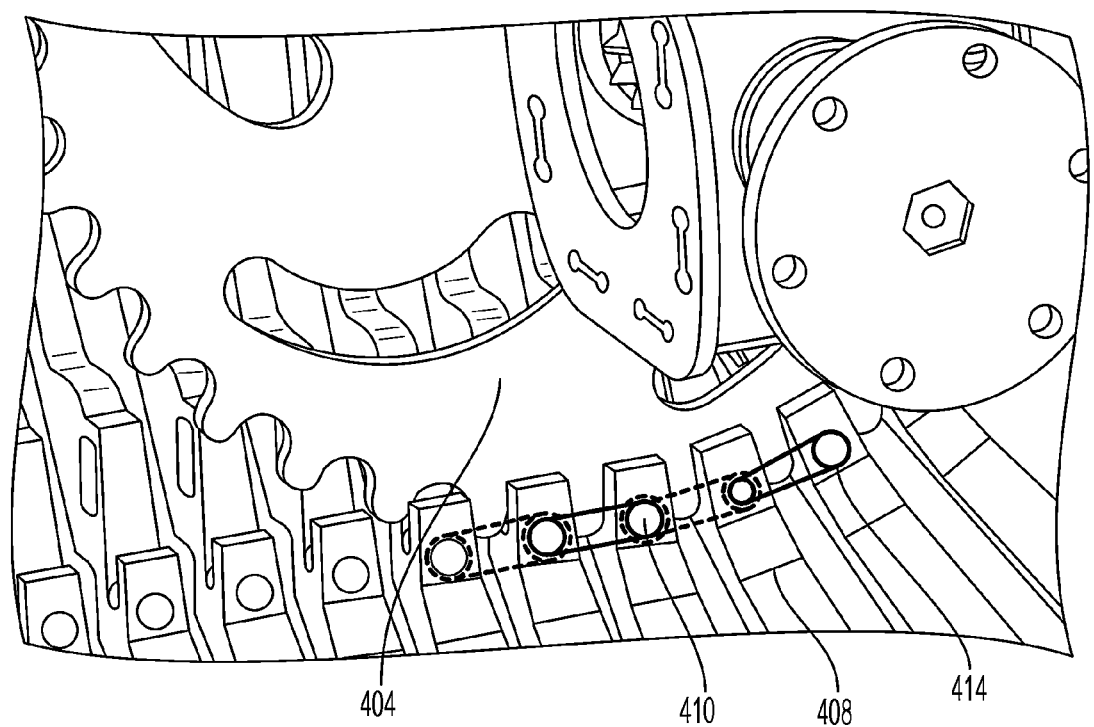

FIG. 4B illustrates an example of a tread connector 414 used to connect each tread link 408 to each other. The tread connectors 414 are coupled to the tread links 408 via each first hole 410 of a tread link 408.

Figure 5:
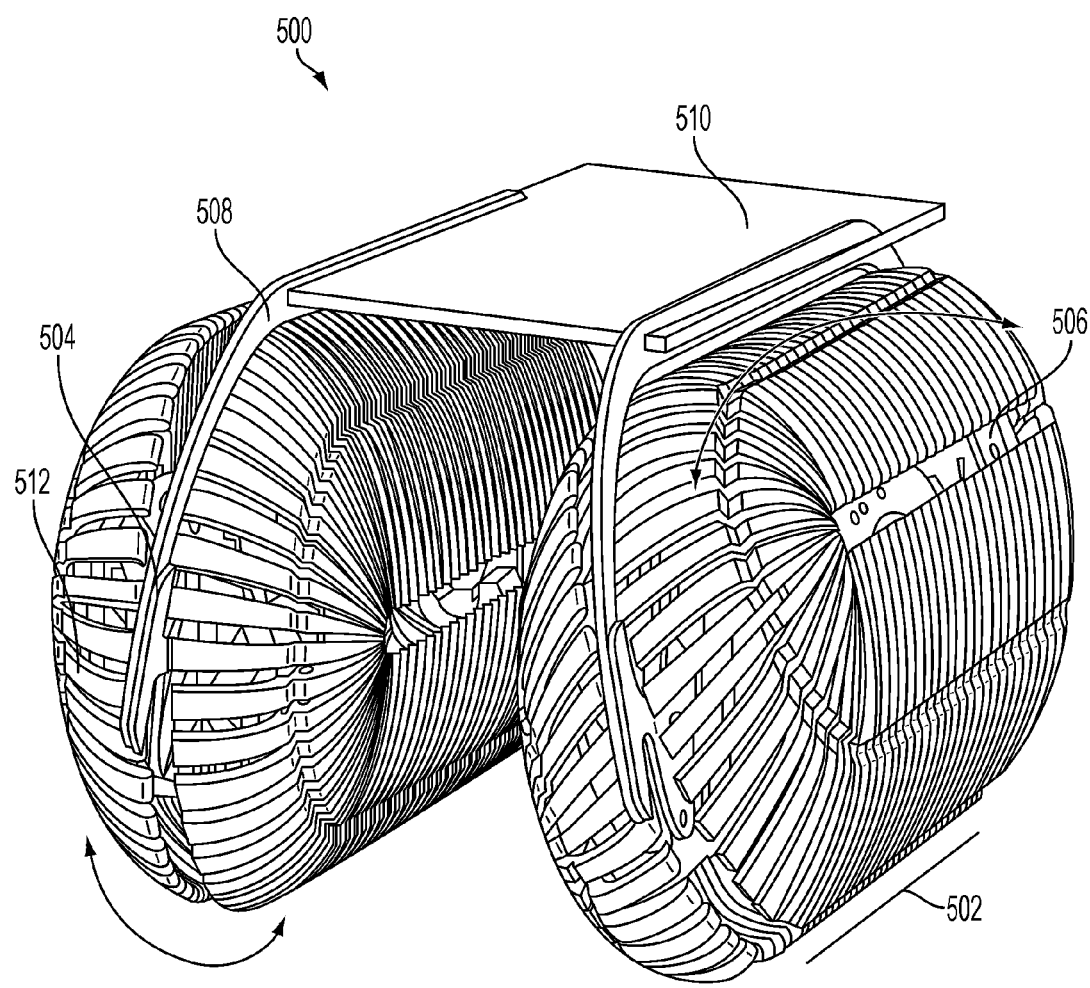
FIG. 5 illustrates an example of a tread for a vehicle according to an aspect of the present disclosure.

FIG. 5 illustrates a vehicle 500 including treads. As shown in FIG. 5, two treads 502 are mounted to the arms 508 of the vehicle 500. Specifically, the brackets 504 of the tread modules 506 couple with the arms 508 of the body 510. As previously discussed, each tread 502 includes multiple tread links 512. The treads 502 may rotate right/left or forward/backwards as indicated by the directional arrows. The treads 502 may comprise two tread halves. Each tread half is connected to a sprocket (not shown) of a tread module 506. A gap may be present between the tread halves to allow the tread to rotate around the arm 508. As shown in FIG. 5, the components, such as the tread modules 506 are defined within each tread 502.

Figure 6:
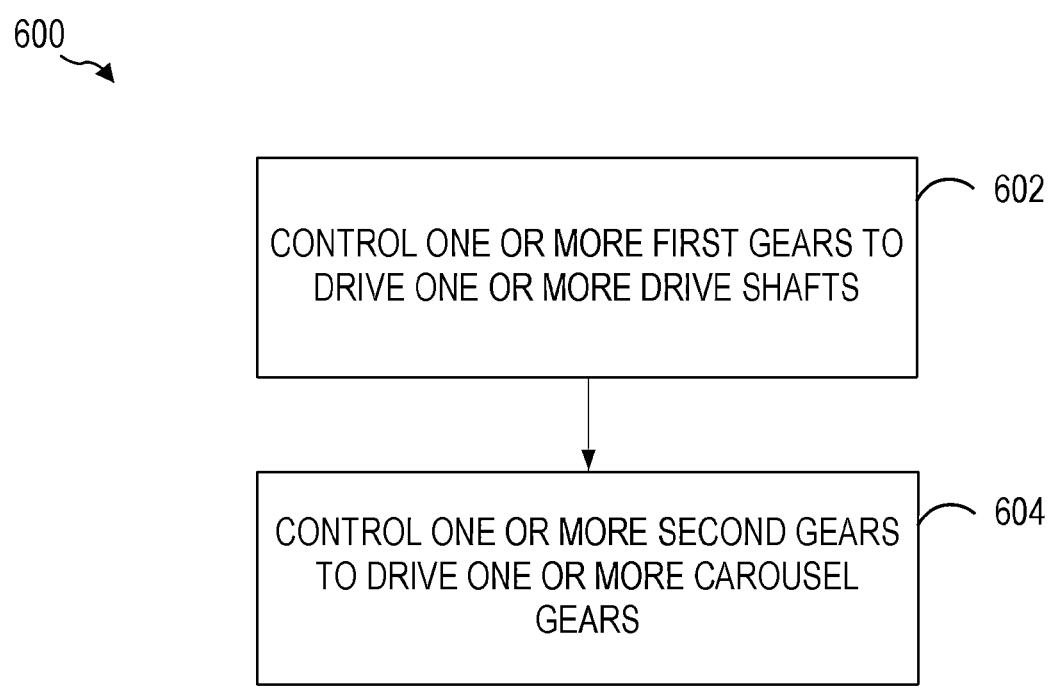
FIG. 6 is a block diagram illustrating a method for autonomously controlling a robot in accordance with an aspect of the present disclosure.

FIG. 6 illustrates a flow diagram 600 for autonomously controlling a robot in accordance with aspects of the present disclosure. As shown in block 602, the robot controls one or more first gears to drive one or more drive shafts. Furthermore, as shown in block 604, the robot controls one or more second gears to drive one or more carousel gears.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. In one configuration, the robotic device includes a means for controlling. The controlling means may be the motors and/or gears illustrated in FIGS. 1-5. In another configuration, the aforementioned means may be any module or any apparatus configured to perform the functions recited by the aforementioned means. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus.

The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A robotic device, the robotic device comprising:
   a tread;
   a plurality of sprockets coupled to a tread module encompassed by the tread, the tread module comprising:
      a housing coupled to the robotic device;
      a plurality of first drive gears coupled to a drive shaft gear of the tread module, the plurality of first drive gears configured to move the tread in a forward direction and/or a reverse direction by driving the plurality of sprockets via an axle;
      a second drive gear coupled to a carousel gear of the tread module; and
      a carousel coupled to the carousel gear, the second drive gear configured to rotate the tread in at least one orthogonal direction relative to the forward direction and the reverse direction by driving the carousel via the carousel gear.

2. The robotic device of claim 1, in which the tread module further comprises:
   a third gear coupled to a drive shaft of the tread module; and
   an axle gear coupled to the axle, the third gear configured to drive the axle via the axle gear.

3. The robotic device of claim 2, in which:
   the drive shaft gear is coupled to the drive shaft; and
   the plurality of first drive gears are configured to drive the drive shaft to move the plurality of sprockets in the forward direction or the reverse direction via the axle.

4. The robotic device of claim 3, in which the carousel houses the axle, the third gear, and the axle gear.

5. The robotic device of claim 1, in which the tread is one of a plurality of treads of the robotic device.

6. A method of controlling a robotic device, the method comprising:
   controlling a first plurality of drive gears to drive a plurality of drive shafts that move a tread of the robotic device in a forward direction or a reverse direction; and
   controlling a second plurality of drive gears to drive a plurality of carousel gears that rotate the tread in at least one orthogonal direction relative to the forward direction and the reverse direction.

7. The method of claim 6, further comprising: moving the tread by rotating a plurality of sprockets coupled to a tread module, encompassed by the tread, in the forward direction or the reverse direction with one of the first plurality of drive gears driving one of the plurality of drive shafts; and
   moving the robotic device in the forward direction or the reverse direction with the tread.

8. The method of claim 6, further comprising:
   rotating a carousel coupled to one of the plurality of carousel gears by rotation of one of the plurality of carousel gears;

rotating the tread in the at least one orthogonal direction relative to the forward direction and the reverse direction based on the rotation of the carousel.

9. An apparatus, comprising:

means for providing locomotion to the apparatus;

means for engaging the means for providing locomotion, the means for engaging coupled to a tread module encompassed by the means for providing locomotion, the tread module comprising:

first means for housing coupled to the apparatus;

first means for driving coupled to a drive shaft gear of the tread module, the first means for driving configured to move the means for providing locomotion in a forward direction and/or a reverse direction by driving the means for engaging via an axle;

second means for driving coupled to a carousel gear of the tread module; and second means for housing coupled to the carousel gear, the second means for driving configured to rotate the means for engaging in at least one orthogonal direction relative to the forward direction and the reverse direction by driving the second means for housing via the carousel gear.

10. The apparatus of claim 9, in which the tread module further comprises:

third means for driving coupled to a drive shaft of the tread module; and fourth means for driving coupled to the axle, the third means for driving configured to drive the axle via the fourth means for driving.

11. The apparatus of claim 10, in which:

the third means for driving is coupled to the drive shaft; and the first means for driving is configured to drive the drive shaft to move the means for engaging in the forward direction or the reverse direction via the axle.

12. The apparatus of claim 11, in which the second means for housing houses the axle, the third means for driving, and the fourth means for driving.

13. The apparatus of claim 9, in which the means for providing locomotion is one of a plurality of means for providing locomotion.

* * * * *